United States Patent [19]
Otsuka

[11] Patent Number: 6,023,113
[45] Date of Patent: Feb. 8, 2000

[54] AXIAL FLOW FAN MOTOR

[75] Inventor: Shuichi Otsuka, Miyota-machi, Japan

[73] Assignee: Minebea Co., Ltd., Miyota-Machi, Japan

[21] Appl. No.: 09/329,323

[22] Filed: Jun. 10, 1999

[30] Foreign Application Priority Data

Jul. 16, 1998 [JP] Japan .................... 10-218545

[51] Int. Cl.[7] ...................................... H02K 7/00
[52] U.S. Cl. ................. 310/67 R; 310/261; 310/43; 310/62; 310/156
[58] Field of Search .................... 310/67 R, 71, 310/218, 261, 43, 258, 62, 63, 89, 156; 384/532

[56] References Cited

U.S. PATENT DOCUMENTS

| | | | |
|---|---|---|---|
| 4,682,065 | 7/1987 | English et al. | 310/90 |
| 5,343,104 | 8/1994 | Takahashi et al. | 310/90 |
| 5,610,458 | 3/1997 | Baker et al. | 310/68 R |
| 5,924,800 | 7/1999 | Obara et al. | 384/532 |
| 5,925,948 | 7/1999 | Matsumoto | 310/67 R |

*Primary Examiner*—Nestor Ramirez
*Assistant Examiner*—Saeed Ghahramani
*Attorney, Agent, or Firm*—Oliff & Berridge, PLC

[57] ABSTRACT

An anti-electrostatic property between an impeller and a lead wire is improved particularly in a case of a miniature axial flow fan motor. In an axial flow fan motor, an impeller (6) integral with a motor yoke (12) is provided on a shaft (5) rotatably supported by bearings (2,3). An end face of the motor yoke (12) confronted with a PC board (8) mounting a drive circuit and its component parts thereon is covered by resin (P). Resin covering this portion suppresses the generation of the electrostatic current at this portion.

1 Claim, 2 Drawing Sheets

AXIAL FLOW FAN MOTOR

BACKGROUND OF THE INVENTION

1. Field of Invention

The present invention relates to an improvement for axial flow fan motors which are provided in various O.A. equipments and so on.

2. Background of Related Art

Devices, such as various O.A. equipments, in which a large number of electronic components are accommodated within casings, may damage the electronic components due to the accumulated heat generated by the electronic components. An axial flow fan motor is attached to a ventilating hole provided through a side wall of the casing to release the internal heat of the casing externally.

An example of related axial flow fan motors will be described with reference to FIG. 3. A casing 1 has an inclined internal periphery that is formed as a venturi portion 1a. A cylindrical portion 1b is provided inside this casing 1. The outer races of two bearings 2 and 3 are supported by this cylindrical portion 1b so that these bearings 2 and 3 are spaced from each other. A shaft 5, provided at its one end with a washer 4, is fittingly supported by the inner races of the bearings 2 and 3. A central portion 6a of an impeller 6 is mounted onto this shaft 5. The impeller 6 is made of synthetic resin, and has a shape in section. A fan 6c is provided on an outer peripheral portion 6b of the impeller 6. A spring 7 is interposed between the central portion 6a of the impeller 6 and the bearing 2 to urge the impeller 6 upwardly in FIG. 3.

Outside the cylindrical portion 1b of the casing 1 is a PC board 8 on which a drive circuit and component parts therefor are mounted is provided. A stator assembly 10 is provided above the PC board 8, and the PC board 8 is fixed to the stator assembly 10 through a pin 9. The stator assembly 10 includes a stator yoke 10a and a coil 10b. A lead wire 11 is provided so as to supply electric current from a power source circuit (not shown) with the coil 10b through the drive circuit.

A motor yoke 12 is molded onto the outer peripheral portion 6c of the impeller 6. A magnet 13 is attached to this motor yoke 12 so as to be confronted with the stator assembly 10. As shown in FIG. 3, the motor yoke 12 has an L-shape, and a portion of the impeller 6, which corresponds in location to a bent portion of the motor yoke 12, is provided with a small hole 6d. This small hole 6d is formed as a consequence of the removal of a penetrated support rod which has been used to support the motor yoke 12 during molding. After the completion, the motor yoke 12 can be viewed from the outside through this small hole 6d.

The axial flow fan motor thus constructed operates as follows: That is, when the electric current is applied to the drive circuit incorporated in the PC board 8 through the lead wire 11 from the power source circuit (not shown), the drive circuit supplies the electric current to the coil of the stator assembly 10 to produce magnetic effect in cooperation with the motor yoke 12 and the magnet 13. Thus, the shaft 5 and the impeller 6 are rotated together. This rotation generates air flow between the fan 6c of the impeller 6 and the venturi portion 1a so that the air flow is directed upwardly in the drawing. The O.A. equipment or the like to which this axial flow fan motor is attached can be ventilated in this manner.

However, it was found out through an electrostatic test that the anti-electrostatic reliability can not be ensured between the impeller and the lead wire during the operation in this manner. That is, since a distance between the motor yoke molded on the outer peripheral portion of the impeller and the PC board is small particularly in a case of a miniature motor, the rotation of the impeller induces an electrostatic current between the motor yoke and the PC board. This results in the lowered anti-electrostatic reliability found through the electrostatic test between the impeller and the lead wire.

SUMMARY OF THE INVENTION

The present invention was made in view of the problem found in the related art, and an object of the present invention is to provide a structure which is simple and which can improve the anti-electrostatic property.

As a means for solving the problem, the present invention provides an axial flow fan motor in which an impeller integral with a motor yoke is provided on a shaft rotatably supported by bearings, the axial flow fan motor being characterized in that an end face of the motor yoke confronted with a PC board mounting a drive circuit and its component parts thereon is covered by resin.

As described above, an arrangement, in which the end face of the motor yoke is covered by the resin, is adopted to suppress the generation of an electrostatic current between the motor yoke and the PC board.

DETAILED DESCRIPTION OF PREFERRED EMBODIMENTS

Figure 1:
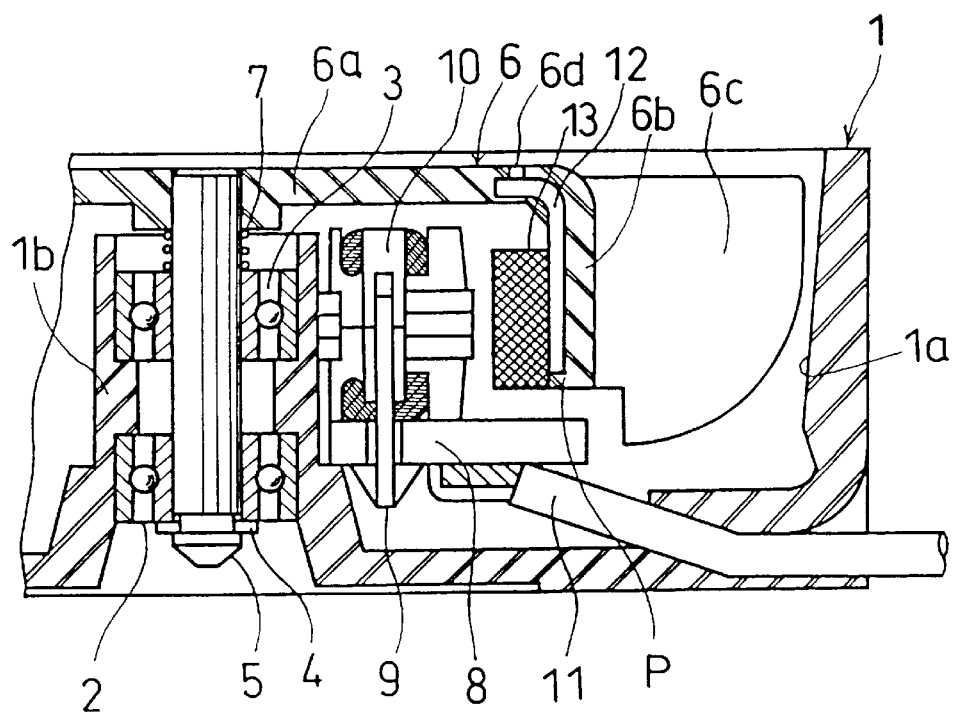
FIG. 1 is a sectional view showing a portion of an axial flow fan motor according to an embodiment of the present invention.
Figure 2:
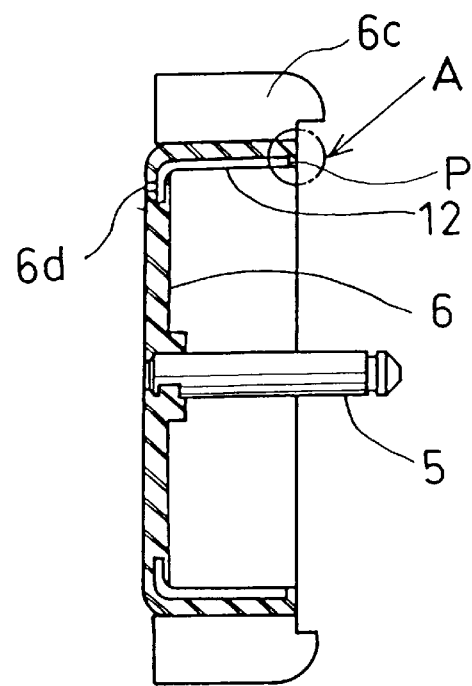
FIG. 2 is a sectional view which only illustrates an impeller and a shaft shown in FIG. 1.
Figure 3:
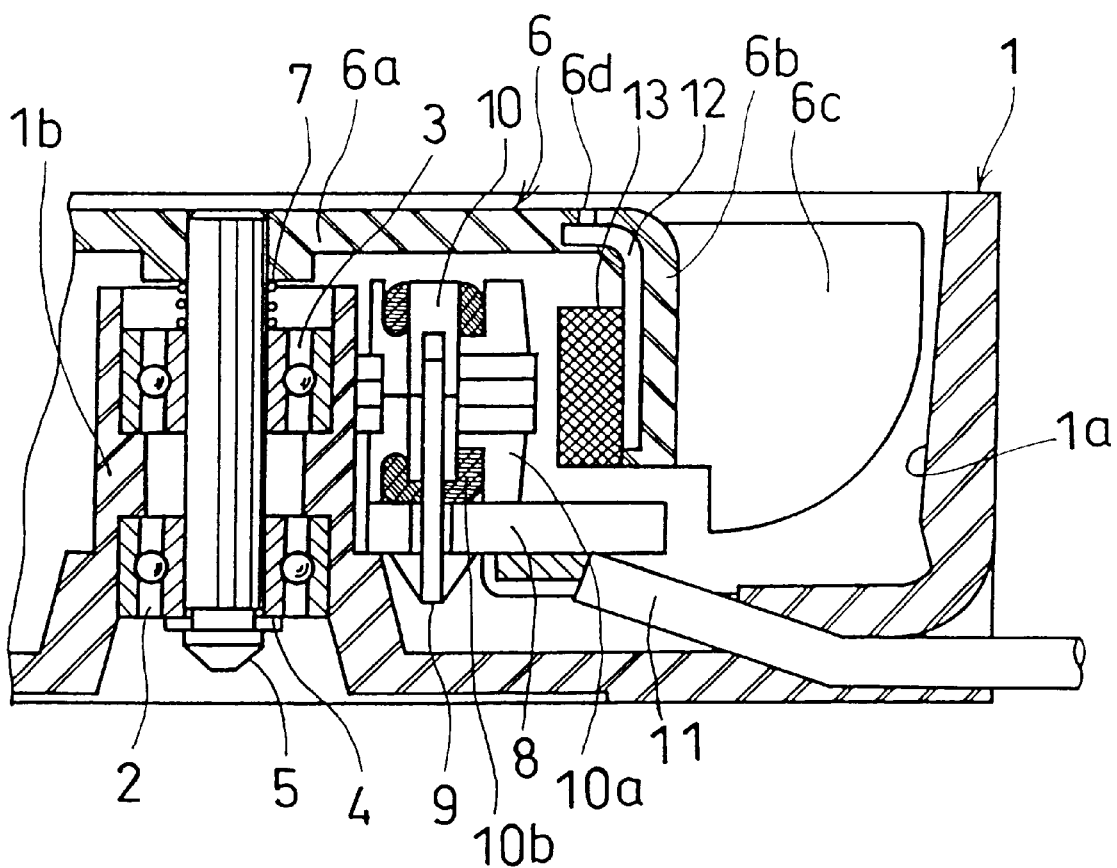
FIG. 3 is a sectional view showing a related axial flow fan motor.
Figure 3:
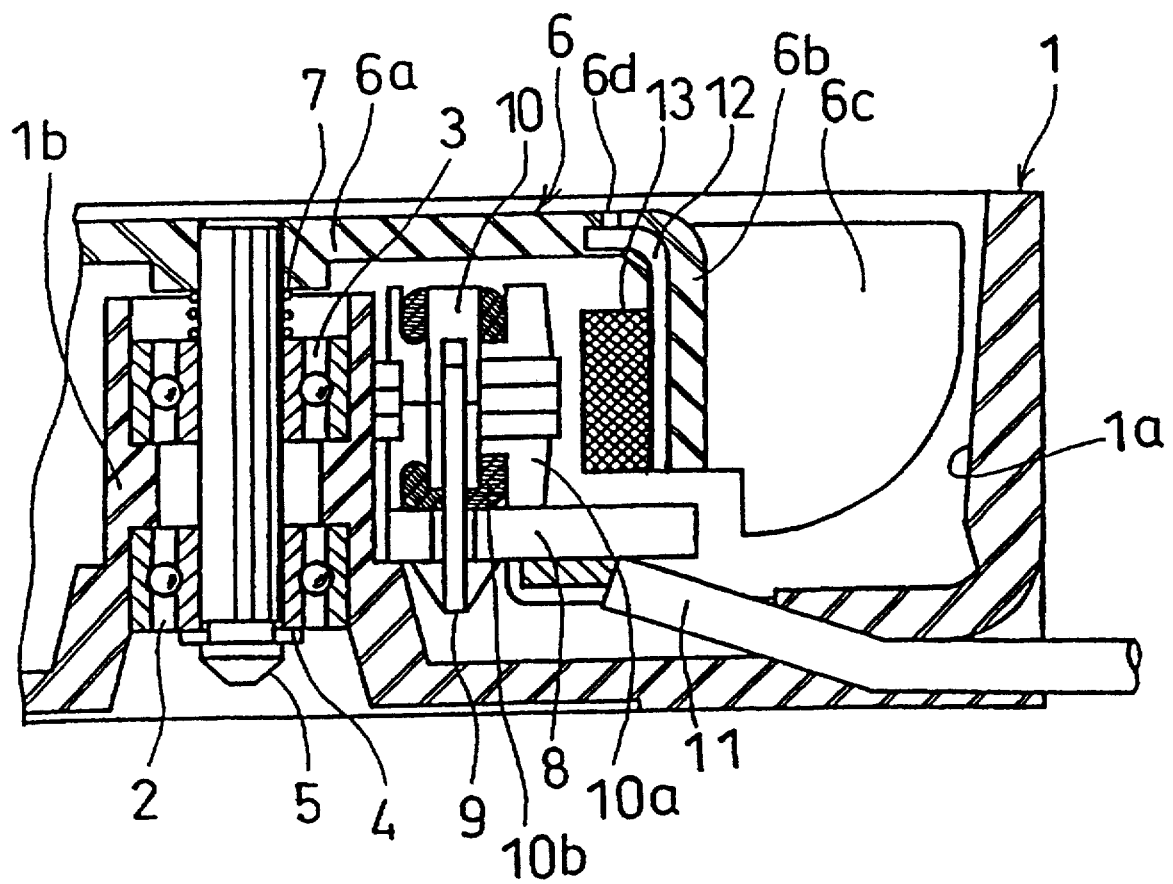

A preferred embodiment of the present invention will now be described with reference to FIGS. 1 and 2. In the drawings, portions, which correspond functionally to those shown in FIG. 3, are designated by the same reference numerals. A casing 1 has an inclined internal periphery that is formed as a venturi portion 1a. A cylindrical portion 1b is provided inside this casing 1. The outer races of two bearings 2 and 3 are supported by this cylindrical portion 1b so that these bearings 2 and 3 are spaced from each other. A shaft 5, provided at its one end with a washer 4, is fittingly supported by the inner races of the bearings 2 and 3. A central portion 6a of an impeller 6 is mounted onto this shaft 5. The impeller 6 is made of synthetic resin, and has a U-shape in section. A fan 6c is provided on an outer peripheral portion 6b of the impeller 6. A spring 7 is interposed between the central portion 6a of the impeller 6 and the bearing 2 to urge the impeller 6 upwardly in FIG. 1.

A PC board 8 is provided outside the cylindrical portion 1b of the casing 1. A stator assembly 10 is provided above the PC board 8, and the PC board 8 is fixed to the stator assembly 10 through a pin 9. The stator assembly 10 includes a stator yoke 10a and a coil 10b. A drive circuit and its component parts are mounted on the PC board 8. A lead wire 11 is provided so as to supply electric current from a power source circuit (not shown) with the coil 10b through the drive circuit.

A motor yoke 12 is molded onto the outer peripheral portion 6c of the impeller 6. A magnet 13 is attached to this motor yoke 12 so as to be confronted with the stator assembly 10. As shown in FIG. 1, the motor yoke 12 has an L-shape, and a portion of the impeller 6, which corresponds in location to a bent portion of the motor yoke 12, is provided with a small hole 6d. This small hole 6d is formed as a consequence of the removal of a penetrated support rod which has been used to support the motor yoke 12 during molding. After the completion, the motor yoke 12 can be viewed from the outside through this small hole 6d.

The above description is the same as that in connection with FIG. 3. A characterizing feature of the present invention is the following: In a portion A in FIG. 2, a motor yoke 12, which is confronted with the PC board 8 mounting the drive circuit and its component parts thereon, is made slightly small in length. Further, the end face of the motor yoke 12 is integrally covered by resin P so as to provide a surface substantially flush with the end face of the impeller 6. As to the resin, electrically insulative resins is preferably used, and the resin may be small in thickness. By covering this portion, an electrostatic current is hardly generated between this portion and the portion of the PC board confronted therewith.

According to the present invention, an axial flow fan motor is constructed as described above. By covering an end face of a motor yoke, the generation of electrostatic current can be suppressed around this portion. Hence, the excellent anti-electrostatic property can be obtained, which is confirmed through an electrostatic test conducted between an impeller and a lead wire.

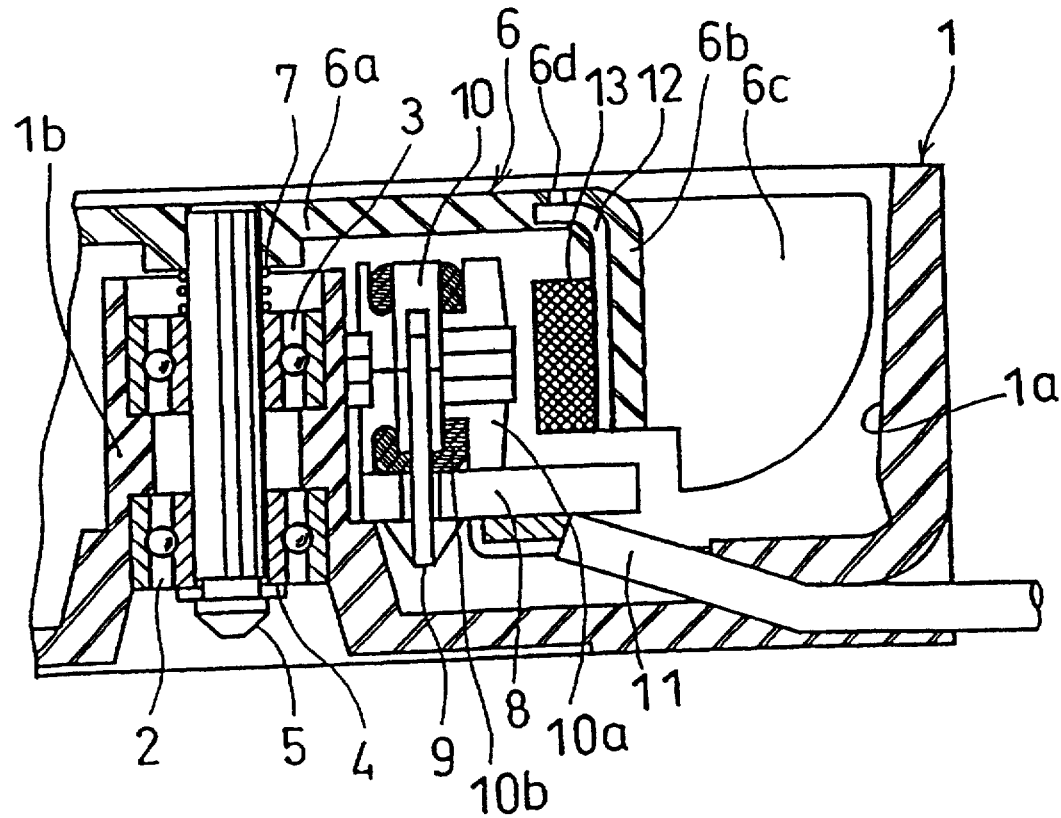

What is claimed is:

1. An axial flow fan motor in which an impeller integral with a motor yoke is provided on a shaft rotatably supported by bearings, said axial flow fan motor being characterized in that an end face of the motor yoke confronted with a PC board mounting a drive circuit and its component parts thereon is covered by resin.

* * * * *

UNITED STATES PATENT AND TRADEMARK OFFICE
CERTIFICATE OF CORRECTION

PATENT NO. : 6,023,113
DATED : February 8, 2000
INVENTOR(S) : Shuichi Otsuka

It is certified that error appears in the above-identified patent and that said Letters Patent is hereby corrected as shown below:

Please substitute Attached Figure 3 with Patented Figure 3

<u>Title Page:</u>
Showing an illustrative figure, should be deleted and substituted therefor the attached title page.

Signed and Sealed this

Twenty-fourth Day of July, 2001

*Attest:*

*Attesting Officer*

NICHOLAS P. GODICI
*Acting Director of the United States Patent and Trademark Office*

United States Patent [19]

Otsuka

[11] Patent Number: 6,023,113
[45] Date of Patent: Feb. 8, 2000

[54] AXIAL FLOW FAN MOTOR

[75] Inventor: Shuichi Otsuka, Miyota-machi, Japan

[73] Assignee: Minebea Co., Ltd., Miyota-Machi, Japan

[21] Appl. No.: 09/329,323

[22] Filed: Jun. 10, 1999

[30] Foreign Application Priority Data

Jul. 16, 1998 [JP] Japan ................. 10-218545

[51] Int. Cl.[7] ............................. H02K 7/00
[52] U.S. Cl. ................. 310/67 R; 310/261; 310/43; 310/62; 310/156
[58] Field of Search ................. 310/67 R, 71, 310/218, 261, 43, 258, 62, 63, 89, 156; 384/532

[56] References Cited

U.S. PATENT DOCUMENTS

| | | | |
|---|---|---|---|
| 4,682,065 | 7/1987 | English et al. | 310/90 |
| 5,343,104 | 8/1994 | Takahashi et al. | 310/90 |
| 5,610,458 | 3/1997 | Baker et al. | 310/68 R |
| 5,924,800 | 7/1999 | Obara et al. | 384/532 |
| 5,925,948 | 7/1999 | Matsumoto | 310/67 R |

Primary Examiner—Nestor Ramirez
Assistant Examiner—Saeed Ghahramani
Attorney, Agent, or Firm—Oliff & Berridge, PLC

[57] ABSTRACT

An anti-electrostatic property between an impeller and a lead wire is improved particularly in a case of a miniature axial flow fan motor. In an axial flow fan motor, an impeller (6) integral with a motor yoke (12) is provided on a shaft (5) rotatably supported by bearings (2,3). An end face of the motor yoke (12) confronted with a PC board (8) mounting a drive circuit and its component parts thereon is covered by resin (P). Resin covering this portion suppresses the generation of the electrostatic current at this portion.

1 Claim, 2 Drawing Sheets